(12) United States Patent
Burgoon et al.

(10) Patent No.: US 7,077,247 B2
(45) Date of Patent: Jul. 18, 2006

(54) BRAKE ROTOR ATTACHMENT ASSEMBLY THAT PROMOTES IN PLANE UNIFORM TORQUE TRANSFER DISTRIBUTION

(75) Inventors: Donald L. Burgoon, Gastonia, NC (US); Wenqi Qian, Fort Mill, SC (US); Jason C. Oakley, Fort Mill, SC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 11/117,038

(22) Filed: Apr. 28, 2005

(65) Prior Publication Data

US 2005/0194224 A1    Sep. 8, 2005

Related U.S. Application Data

(62) Division of application No. 10/404,534, filed on Apr. 2, 2003.

(60) Provisional application No. 60/440,611, filed on Jan. 17, 2003, provisional application No. 60/453,519, filed on Mar. 12, 2003.

(51) Int. Cl.
*F16D 65/10* (2006.01)

(52) U.S. Cl. .............................. 188/218 XL; 188/18 A

(58) Field of Classification Search ............ 188/218 R, 188/218 XL, 18 A, 264 AA; 301/6.1; 192/217.3; 403/408.1; 411/84, 87, 88, 102; 24/459, 24/569; 248/68.1, 71, 73
See application file for complete search history.

(56) References Cited

U.S. PATENT DOCUMENTS

| | | |
|---|---|---|
| 2,753,959 A | 7/1956 | Johnson |
| 3,542,166 A | 11/1970 | Harrison |
| 3,773,153 A | 11/1973 | Smirl |
| 4,102,443 A | 7/1978 | Kohler et al. |
| 4,108,286 A | 8/1978 | Gagarin |
| 4,379,501 A | 4/1983 | Hagiwara et al. |
| 4,416,564 A | 11/1983 | Billet et al. |
| 4,576,255 A | 3/1986 | Mery et al. |
| 4,662,482 A | 5/1987 | Bass |
| 4,886,235 A | 12/1989 | Thornborrow |
| 5,190,124 A | 3/1993 | Haneda |

(Continued)

FOREIGN PATENT DOCUMENTS

DE    42 11 868 A1    10/1993

(Continued)

OTHER PUBLICATIONS

"Braking Power Under Control", Catalogue 2000, pp. 1-19, 35-37.

*Primary Examiner*—James McClellan
*Assistant Examiner*—Mariano Sy
(74) *Attorney, Agent, or Firm*—Caroline D. Dennison; Roberts, Mlotkowski & Hobbes

(57) ABSTRACT

A brake assembly for use on vehicles includes a rotor and a wheel mount, formed as a hat portion, fastened to the rotor with a bobbin assembly. The rotor has a flange formed as a series of spaced tabs, and the bobbin assembly is bolted to the hat portion with the rotor flange clamped therebetween. A spring clip can be used with the bobbin to accommodate thermal expansion of the rotor and eliminate rotor rattling. The bobbin has a binocular shape that receives a pair of bolts. A crush zone can be provided between the rotor and the bobbin yields to accommodate machining tolerances of the rotor and promote uniform torque transfer distribution to the hub. Torque is transferred from the brake rotor to the hat portion in a common plane to prevent twisting in the fastener connection.

25 Claims, 17 Drawing Sheets

U.S. PATENT DOCUMENTS

| | | |
|---|---|---|
| 5,305,872 A | 4/1994 | Hutton |
| 5,368,526 A | 11/1994 | Hynes |
| 5,437,351 A | 8/1995 | Lindner |
| 5,520,269 A | 5/1996 | Yamamoto et al. |
| 5,788,026 A | 8/1998 | Poli |
| 6,076,896 A | 6/2000 | Bertetti et al. |
| 6,098,764 A | 8/2000 | Wirth et al. |
| 6,116,386 A | 9/2000 | Martin |
| 6,247,562 B1 | 6/2001 | Gotti et al. |
| 6,267,210 B1 | 7/2001 | Burgoon et al. |
| 6,302,246 B1 | 10/2001 | Naumann et al. |
| 6,374,956 B1 | 4/2002 | Naumann et al. |
| 6,446,770 B1 | 9/2002 | Qian et al. |
| 6,467,588 B1 | 10/2002 | Baumgartner et al. |
| 6,604,613 B1 | 8/2003 | Burgoon et al. |
| 6,640,937 B1 | 11/2003 | Bunker |
| 2004/0035659 A1 | 2/2004 | Pacchiana et al. |

FOREIGN PATENT DOCUMENTS

| | | |
|---|---|---|
| DE | 197 26 674 A1 | 1/1998 |
| DE | 198 07 184 C1 | 4/2000 |
| EP | 0 127 932 | 12/1984 |
| EP | 0 726 406 B1 | 2/1996 |
| FR | 2056625 | 5/1971 |
| FR | 2 546 250 | 11/1984 |
| GB | 1 080 035 | 4/1966 |
| GB | 2 184 801 A | 7/1987 |
| JP | 50-21616 | 7/1975 |
| JP | 50-42302 | 12/1975 |
| JP | 60-201127 | 10/1985 |
| JP | 61-241538 | 10/1986 |
| JP | 64-17041 | 1/1989 |
| JP | 9-166168 | 6/1997 |
| WO | WO 02/01088 A1 | 1/2002 |

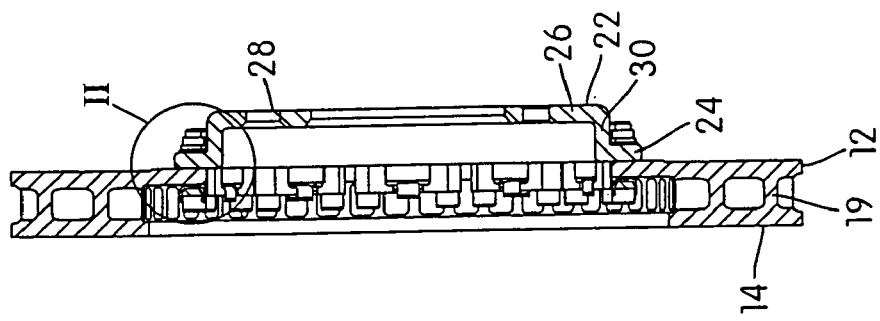
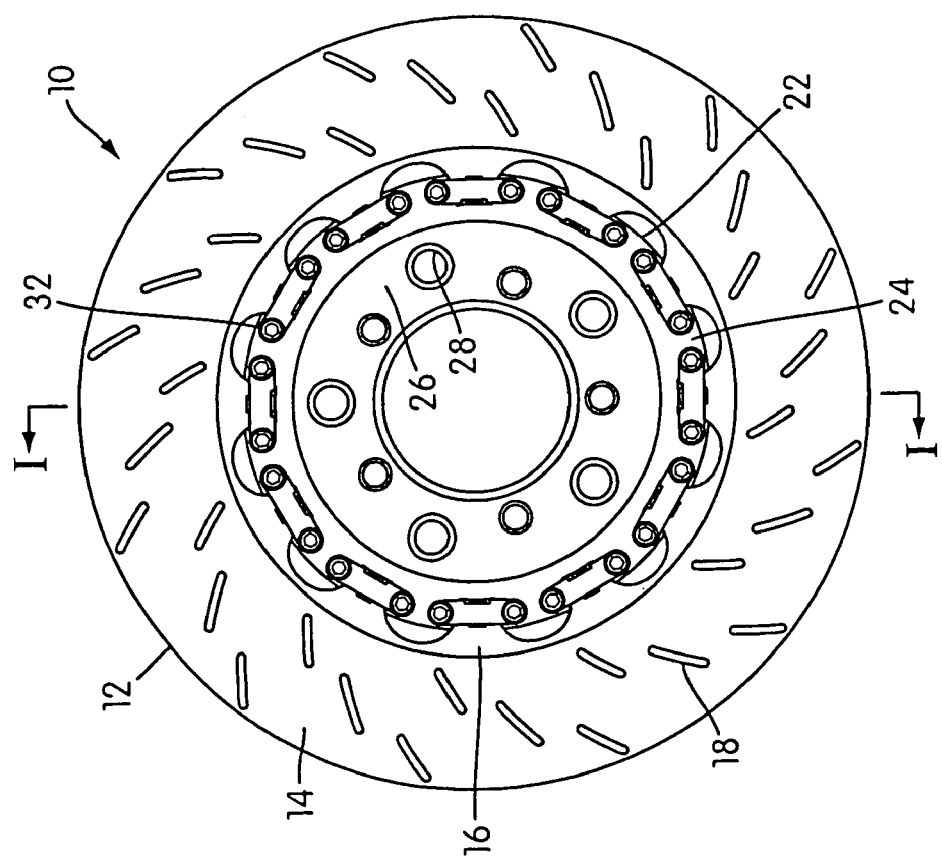
FIG. 1B
FIG. 1A

BRAKE ROTOR ATTACHMENT ASSEMBLY THAT PROMOTES IN PLANE UNIFORM TORQUE TRANSFER DISTRIBUTION

This application is a divisional application of U.S. Ser. No. 10/404,534 filed Apr. 2, 2003, which claims priority from provisional application No. 60/440,611 filed Jan. 17, 2003, and No. 60/453,519 filed Mar. 12, 2003. The contents of each of these applications are hereby incorporated herein by reference.

BACKGROUND OF THE INVENTION

1. Field of the Invention

The invention relates to brake assemblies, especially vehicular brakes including brake rotors attached to wheel hubs.

2. Description of Related Art

One type of common prior art brake design for vehicles is a two piece hat rotor and hub in which a hat rotor that carries the braking surface is detachably connected to a wheel hub. Another common type of brake design is an integrated one-piece rotor and hub assembly.

Integrated one-piece rotor and hub assemblies have the advantage that no fasteners are required between the rotor and the hub. As a result, the integrated assemblies do not face problems associated with fasteners such as wear and fatigue near fastener openings and potential misalignment due to imperfect machining. A significant drawback, however, is that the assembly is constrained at the hub, which causes thermal distortion of the rotor. Such thermal distortion can damage the rotor and when the rotor is damaged or worn, entire integrated assembly must be replaced. This is expensive and time consuming.

Complete replacement is avoided by using a two piece hat rotor and hub assembly, which facilitates rotor replacement. When a rotor becomes worn or cracked, the rotor disc can be detached from the hub for less expensive and easier replacement than with the integrated design. Hat rotors are typically one piece metal castings having a rotor portion integrally cast with a hat portion. The hat portion of the hat rotor is a large flange that fits over a mounting surface of the hub. The hat portion includes wheel stud apertures through which wheel studs can pass. Hat rotors can also be made as two pieces with a flat rotor disc fastened to the hat portion.

Hat rotors, however, also have some drawbacks. In particular, hat rotors and hubs are typically individual metal castings. Subsequent to casting, the hat rotor and the hub must both be individually machined. The machined surfaces of the rotor hat portion, the rotor braking surfaces, and the mounting surface of the hub must all be in the proper plane to minimize rotor run-out, which is the rotational misalignment of the rotor. Specifically, rotor run-out is the measurement of the extent to which the rotor wobbles, or deviates outside the intended plane of rotation, as the rotor rotates with the hub about the wheel shaft. Rotor run-out causes excessive and uneven wear in the rotor braking surfaces and in brake pads which contact the rotor braking surfaces. Rotor run-out also increases thermal distortion of the brake rotor. The thermal distortion results in thermal judder, noise, and vibrations during braking, as well as causing irregular braking pulsations. This can be a significant problem as it is very difficult to achieve perfect machining.

Another deficiency with hat rotor hub assemblies results from the manner in which a hat rotor and a wheel are mounted together on the hub. The hat rotor is installed over a mounting surface of the hub, and then the hat rotor is loosely mounted on the hub until a wheel is subsequently mounted on the hub. As wheel lug nuts are tightened to the wheel studs, the hat rotor is sandwiched between the wheel and the hub, thus securing the hat rotor to the hub. However, if the wheel lug nuts are not evenly tightened, the uneven forces acting on the hub may result in the distortion of the hub. Additionally, if the wheel rim has been improperly manufactured, the wheel rim might impose a distortion on the hub as the lug nuts are tightened. Any distortion on the hub will be directly transferred to the rotor, as the portion of the hub that is potentially distorted is also the mounting surface for the rotor in all hat rotor designs. This induces stresses in the rotor.

A further concern of both integrated rotor hubs and hat rotor hubs is that the rotor in both of these designs is fixed with respect to the hub. During braking, the rotor in such an assembly is subjected to high frictional forces that generate heat in the rotor causing thermal expansion/distortion, temperature variation across the face of the rotor, and heat transfer to the adjacent components including the hub and the bearings. Thermal expansion of the rotor is very limited because of the integral connection between the rotor and the hub. This creates thermal coning in the rotor surface and a large thermal gradient, which will induce high thermal stress leading to thermal cracking. The high thermal gradient generated during braking and the effects of the thermal expansion and distortion can cause vibration and thermal judder across the brake surfaces, resulting in a rough or irregular braking pulsations. The high thermal stress and thermal distortion also reduce the life and performance of the rotor and increase maintenance costs.

One way the thermal stresses have been addressed is to provide a "floating" rotor in which the fastener connection between the rotor and the hat or hub is provided with a small clearance or float that allows thermal expansion. Two-piece rotors also allow greater flexibility with respect to use with different hubs as the same rotor disc can be used with different hat portions. This reduces the cost since generic rotor discs may be used and only the hat portion requires specialized casting, tooling and machining steps. However, stresses induced by fastener assemblies in this design are also a consideration in two-piece hat rotors.

Typical rotor discs in two-piece hat designs have an attachment flange that is perforated to accept a fastener. The hat portion is placed on one side of the attachment flange and a fastener connects the hat portion to the side of the attachment flange. During braking, a frictional force is applied to the rotor surface, which creates torque that is transferred to the attachment flange, to the fastener, through the hat portion and to the hub. Because the hat portion is attached to one side of the attachment flange, which is in a plane axially displaced from the friction braking surface, a moment arm is created at this connection joint. When the torque is transferred through a moment arm, bending stresses are formed in the connection. This creates twisting in the areas adjacent the fastener, which can create fatigue leading to cracking and breaking. The perforated flange tends to become fatigued because the material of the rotor, cast iron for example, weakens at high temperatures leading to fatigue fractures. This also creates problems with run-out, as discussed above, along with premature fracture of components in the connection.

Torque transfer also tends to be non-uniform through the perforated flange, especially in a floating design, as the machining tolerance at each aperture causes certain connections to receive more torque than other connections. This creates high stresses at individual apertures and can cause the attachment flange to crack or to have portions break off.

The two-piece hat rotor assemblies discussed above also have drawbacks associated with the hat portion, which typically has slots that match with the perforations in the rotor attachment flange. Some floating type two piece hat rotor assemblies use a spacer, sometimes called a bobbin, to provide the clearance that accommodates thermal expansion. The bobbin fits in the slots of the hat piece or in slots of the rotor flange, and when torque is applied to the hat through the rotor, the bobbin twists in the slot. This twisting causes the edges of the bobbin, which are typically square to match the slot, to gouge the sides of the slots, thus damaging the slotted piece. This is especially true when the hat piece is manufactured from a material having a lower hardness, such as aluminum, which is popular in high performance and racing applications, or when the rotor is formed of cast iron.

In summary, prior art brake rotors have suffered from problems associated with wear and material fatigue due to stresses induced during the braking process, particularly bending stresses caused during torque transfer and non-uniform transfer of torque caused by machining tolerances. It would be desirable to reduce the stresses experienced by the rotor and, in the case of a two piece rotor, the hat piece to increase performance and durability.

There is a need, therefore, to provide a brake rotor and wheel hub assembly that eliminates bending stresses and promotes uniform torque transfer. It would be desirable to provide a brake rotor assembly that minimizes bending stresses, fatigue stress and accommodates machining inconsistencies to increase the life and reliability of the brake device.

SUMMARY OF THE INVENTION

An aspect of the invention provides a two-piece hat rotor with a fastening assembly between the rotor disc and the hat portion that provides in plane torque transfer.

Another aspect of the invention provides a fastening assembly for a rotor that accommodates thermal expansion of the rotor.

A further aspect of the invention provides a fastener assembly that yields or self corrects to accommodate manufacturing variances of the rotor.

An additional aspect of the invention provides a rotor that has a configuration that is more durable than conventional rotors with respect to fatigue and failure.

Another aspect of the invention provides a fastener assembly that securely clamps a rotor to a wheel hub.

A further aspect of the invention provides a connection between the flange and the hat portion or hub that has a crushable component or yielding zone to promote uniform torque transfer distribution.

An aspect of the invention also provides a spring at the fastener connection to minimize or prevent rattling of the rotor assembly during use.

An additional aspect of the invention provides a rotor with an attachment flange having tabs that are clamped to the hat portion, which can eliminate fatigue fractures and/or stress concentrations typically associated with perforated attachment flanges, to enhance performance and durability.

Another aspect of the invention provides a hat piece for attachment to the rotor that is designed to receive less stresses from the fastener assembly so that material with lower hardness can be used, if desired.

The invention is directed to a brake assembly comprising a rotor having a braking surface and an attachment flange; a hat portion having a mounting surface for attachment to a vehicle wheel; and a fastener assembly that couples the hat portion to the attachment flange. The fastener assembly includes a plurality of bobbins and fasteners. The fasteners extend through the hat portion and each bobbin to clamp the attachment flange between the hat portion and the bobbin. If desired, a spring can be disposed between the attachment flange and bobbin. The fastening assembly transfers torque from the braking surface to the hat portion in a common plane to prevent twisting. A crush zone can also be provided in association with the fastener assembly to promote uniform torque transfer distribution from the attachment flange to the hat portion.

The invention is also directed to a rotor comprising a disc having an annular braking surface and an attachment flange extending radially inwardly from the braking surface. The attachment flange is a series of circumferentially spaced tabs that can be clamped. The attachment flange also has radial edges that have a yieldable surface to accommodate machining tolerances.

The invention is additionally directed to a hat portion in combination with a rotor disc having a braking surface comprising an annular mounting surface with a plurality of apertures that receive fasteners for connection to a vehicle wheel and a cylindrical wall extending around the annular mounting surface. The cylindrical wall has a plurality of apertures therein that receive fasteners for connection to the rotor disc.

The invention is further directed to a fastener assembly for connecting a brake rotor to a wheel mount comprising a bobbin having a pair of columns each with a bolt passage and a bridge connecting the columns. The columns have a first height and the bridge has a second height less than the first height that creates a gap between the columns.

The invention is directed to a brake assembly comprising a rotor including a disc having an annular braking surface and an attachment flange extending radially inwardly from the braking surface. The attachment flange is a series of circumferentially spaced tabs. The assembly also includes a hat portion including an annular mounting surface with a plurality of apertures that receive fasteners for connection to a vehicle wheel and a cylindrical wall extending around the annular mounting surface. The cylindrical wall has a plurality of apertures therein that receive fasteners for connection to the rotor. A fastener assembly connects the rotor to the hat portion and includes a plurality of bobbins each having a pair of columns each with a bolt passage and a bridge connecting the columns. The columns have a first height and the bridge has a second height less than the first height that creates a gap between the columns. One of the tabs is retained in each gap.

These and other aspects of the invention will become apparent in view of the detailed description and drawings herein.

BRIEF DESCRIPTION OF THE DRAWINGS

The invention is described in conjunction with the following drawings in which like reference numerals designate like elements and wherein:

FIG. 1A is a front view of a brake rotor with a hat portion in accordance with an embodiment of the invention;

FIG. 1B is a side view in cross section of FIG. 1A taken along line I—I;

DETAILED DESCRIPTION OF PREFERRED EMBODIMENTS

Figure 1C:
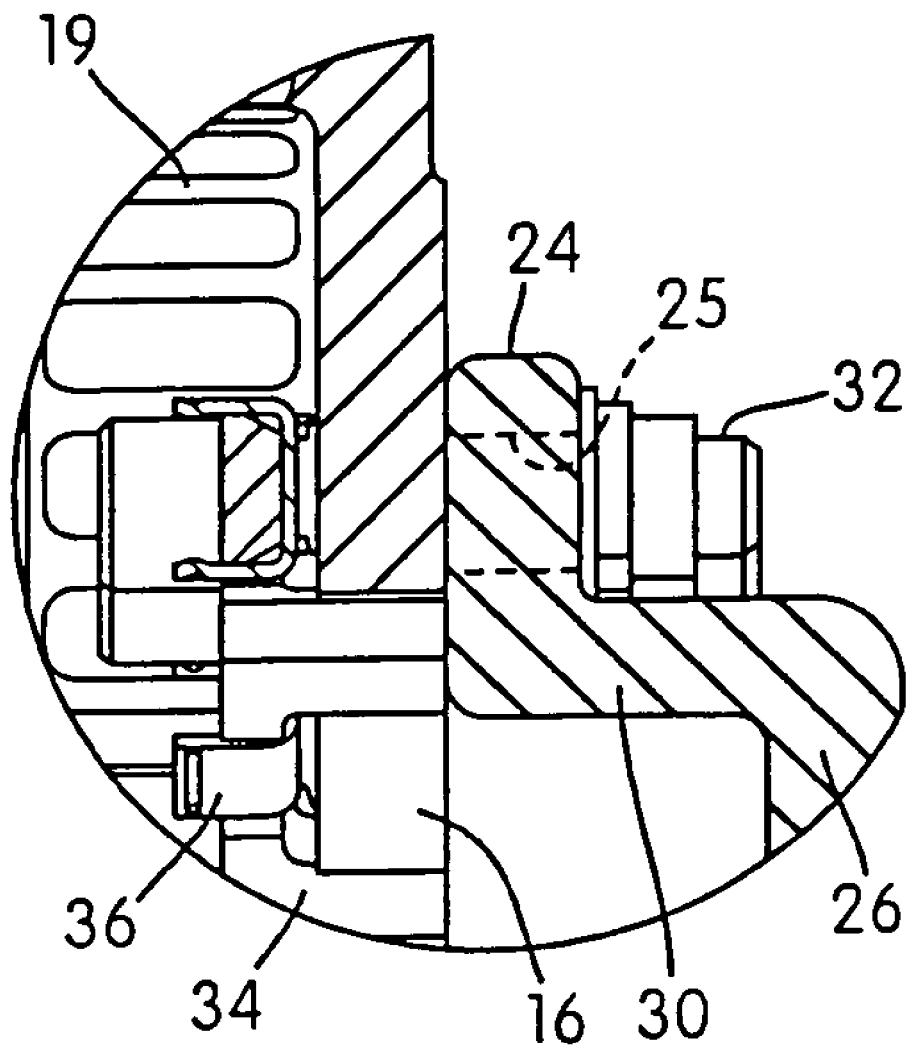
FIG. 1C is an enlarged view of section II of FIG. 1B.

The brake assembly 10 seen in FIG. 1A is preferred for use on vehicles, including automobiles, racing vehicles, trucks, heavy duty trucks, motorcycles and the like. The vehicles suitable for use with this invention can include those vehicles having a gross vehicle weight of less than about 5,000 pounds, a gross vehicle weight of about 5,000 pounds to 12,000 pounds, and a gross vehicle weight of more than about 12,000 pounds, for example 30,000 pounds. However, the inventive concepts discussed herein can be used in any type of application that uses rotary brakes, including automotive, other types of motorized vehicles, or railcars.

FIG. 1A shows a rotor disc 12 formed as an annular plate having a braking surface 14 and an attachment flange 16. As known, the braking surface 14 preferably carries a high friction material or can be specially treated. The braking surface 14, as seen, has a plurality of shallow grooves 18 formed therein. These grooves 18 enhance braking, but are not necessary. Any surface configuration could be used, including a smooth braking surface. The rotor disc 12, as seen in FIG. 1B, is a ventilated rotor having a pair of opposed braking surface 14 separated by vanes 19. Rotor disc 12 is preferably made of cast iron. For example, a suitable material would be Class 35 cast iron, which has a tensile strength of about 35 ksi and a yield strength of about 28 ksi.

Figure 4A:
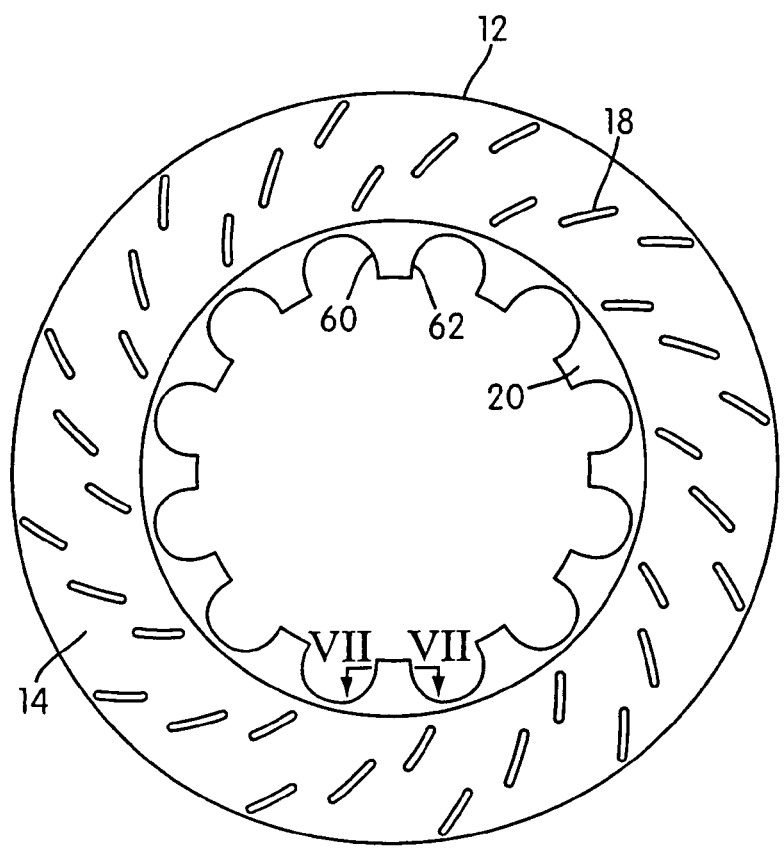
FIG. 4A is a front view of the rotor in accordance with an embodiment of the invention.

One difference between rotor 12, in accordance with this invention, and conventional rotors is that the attachment flange 16 has a series of spaced radial tabs 20, as seen in FIG. 4A. The tabs 20 are preferably formed as solid projections, with no aperture needed for fasteners as in conventional two-piece or floating rotors. However, the tabs 20 could have apertures if desired without affecting the operation of the invention. The important feature of the tabs 20 is that each tab presents a side surface, which extends radially, that is driven by the wheel hub, as discussed below.

Each tab 20 has an edge treatment, in this case threads 21, that functions as a crush or yielding zone. The specific features of the tabs 20 and function of the crush zone are discussed in more detail below. Conventionally, the rotor attachment flange has a series of apertures that are aligned with slots in the wheel mount, which can be a hat portion or hub, for example. Fasteners are then secured through the aligned apertures and slots to attach the rotor disc to the wheel mount. The conventional design, however, creates a perforated flange with bolts retained in the apertures that drive the rotor, which causes the edges of the perforations and thus the attachment flange to be subject to fatigue cracking and failure. The tabs 20 of this invention provide a strong and durable attachment point for the rotor disc 12, which is explained below.

This invention is also applicable to a single plane or non-vented disc rotor. In other words, the configuration of the rotor disc 12 can vary, and this invention can be used with many known types of rotors.

Figure 1D:
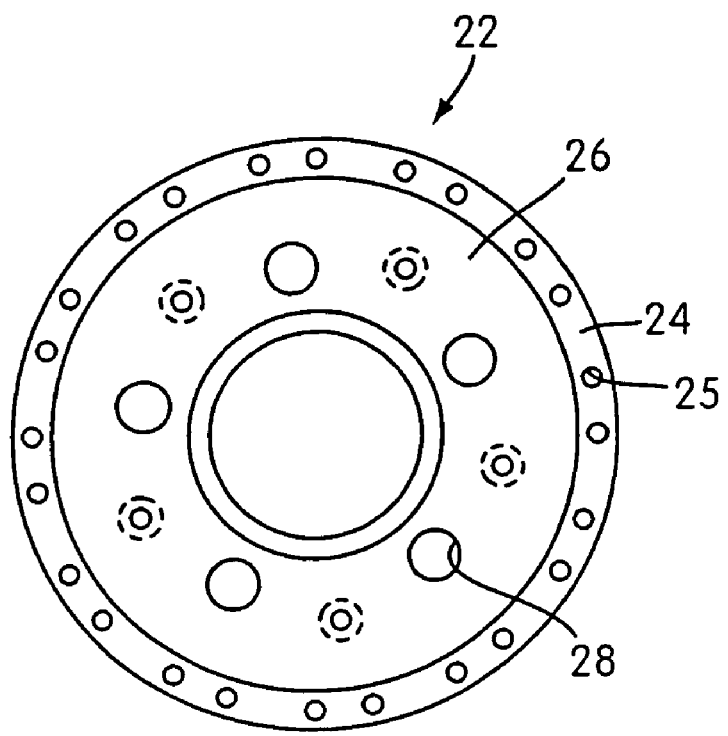
FIG. 1D is a view of the hat portion of FIG. 1A.
Figure 1E:
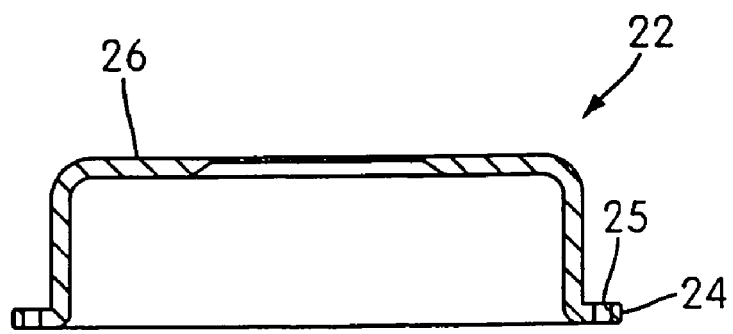
FIG. 1E is a cross section of the hat portion of FIG. 1D.

Rotor disc 12 has a hat portion 22 secured to the attachment flange 16. Hat portion 22 provides a mount for the wheel hub, which is not shown. As seen in FIGS. 1D and 1E, hat portion 22 includes a shoulder 24 and a raised, annular mounting surface 26 with fastener apertures 28 formed therein. The shoulder 24 is spaced from mounting surface 26 by a cylindrical side wall 30. A plurality of apertures 25 are formed in the shoulder 24. As apertures 25 are a series of circular holes, they may be easily and inexpensively machined by drilling, for example, which is an improvement over machining conventional slots that require additional time and skill. Hat portion 22 can be made of cast iron, like the rotor disc 12, or if desired, a material having a lower hardness, such as aluminum, may be used.

For purposes of explanation, the rotor 12 is described as attaching to a hat portion 22. However, it should be understood that this invention presents a fastening assembly that can create a connection with a hat portion, as described, or a hub, a rotating flange, or a bearing housing of a hub assembly. The hat portion 22 as used in this application covers all of these possible connections and is merely used as a name for the element, whatever it may be, that connects to the rotor 12. In operation, the hat portion 22, which either connects to the wheel hub or forms part of the wheel hub supports a vehicle wheel (not shown). Brake pads, not shown, are selectively pressed against the braking surface 14 of rotor disc 12 to slow or stop rotation of rotor disc 12, and thus slow or stop rotation of the hat portion 22 and attached wheel hub and vehicle wheel.

Figure 2B:
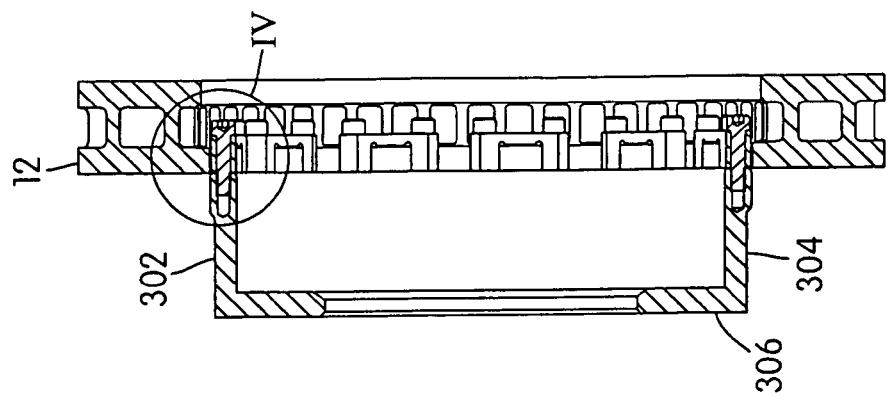
FIG. 2B is a side view in cross section of FIG. 2A taken along line III—III.
Figure 2A:
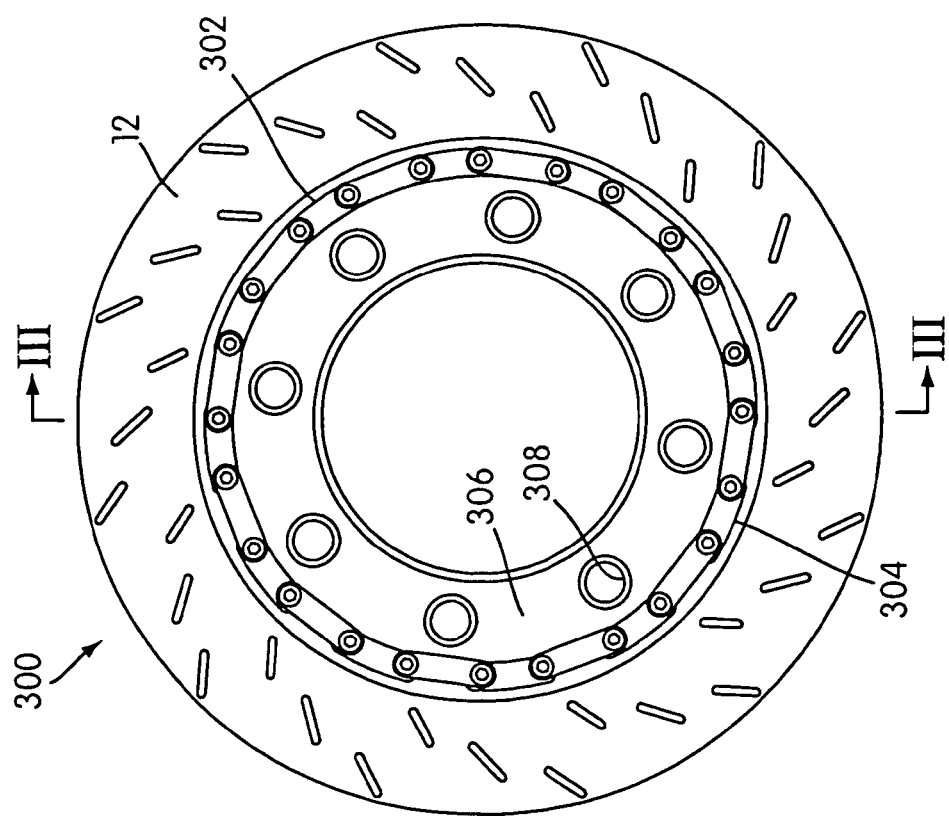
FIG. 2A is a front view of a brake rotor with a hat portion in accordance with another embodiment of the invention.
Figure 2C:
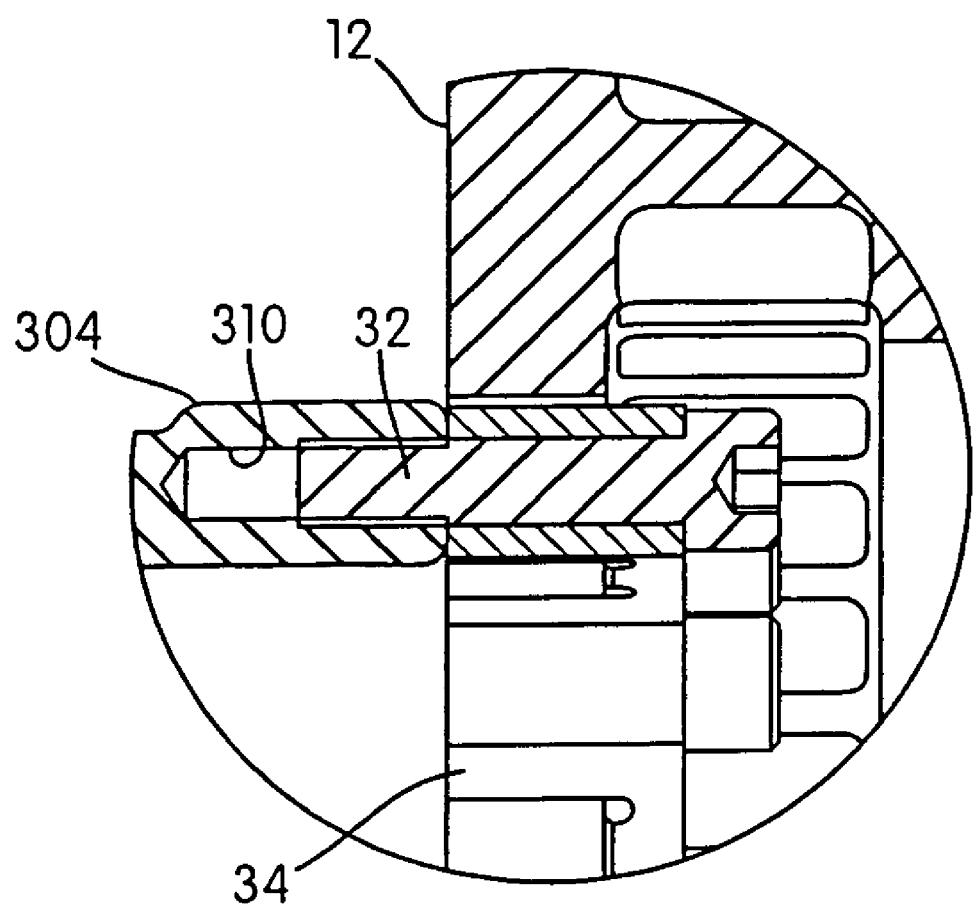
FIG. 2C is an enlarged view of section IV of FIG. 2B.

Other types of hat portions may also be used with this invention. FIGS. 2A–2C show a rotor assembly 300 including a rotor disc 12 with a hat portion 302, which has a cylindrical side wall 304 and a raised mounting surface 306 with fastener apertures 308 for securing the rotor assembly to a wheel hub. The side wall 304 has a plurality of spaced channel type apertures 310 formed in its peripheral edge, as seen in FIG. 2C. Each channel 310 is sized to receive a fastener to secure the rotor disc 12 to the hat portion 302. In operation, the fastener is threaded. So, a threaded connection is formed upon inserting and rotating the fastener in the channel 310. Alternatively, the channel 310 could be provided with threads. The remaining elements of the rotor assembly that are similar to the embodiment shown in FIG. 1A-C are not described in detail.

Figure 3B:
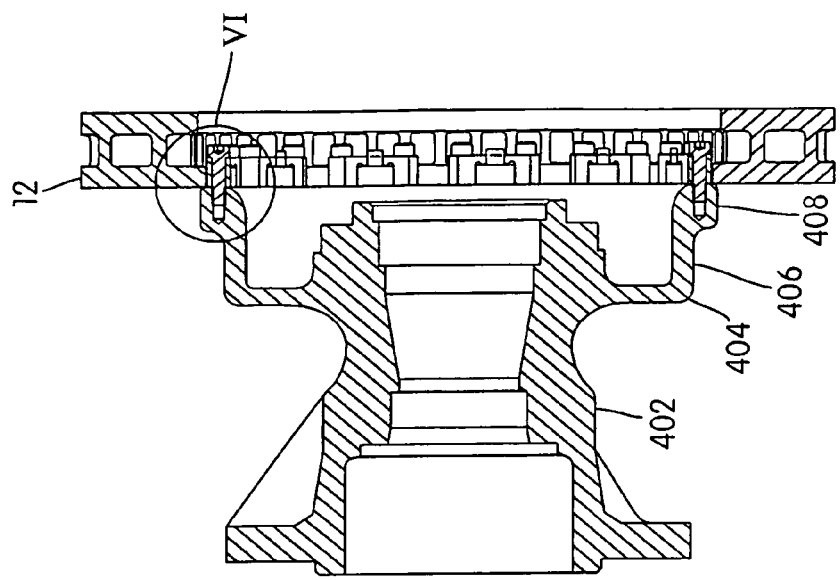
FIG. 3B is a side view in cross section of FIG. 3A taken along line V—V.
Figure 3A:
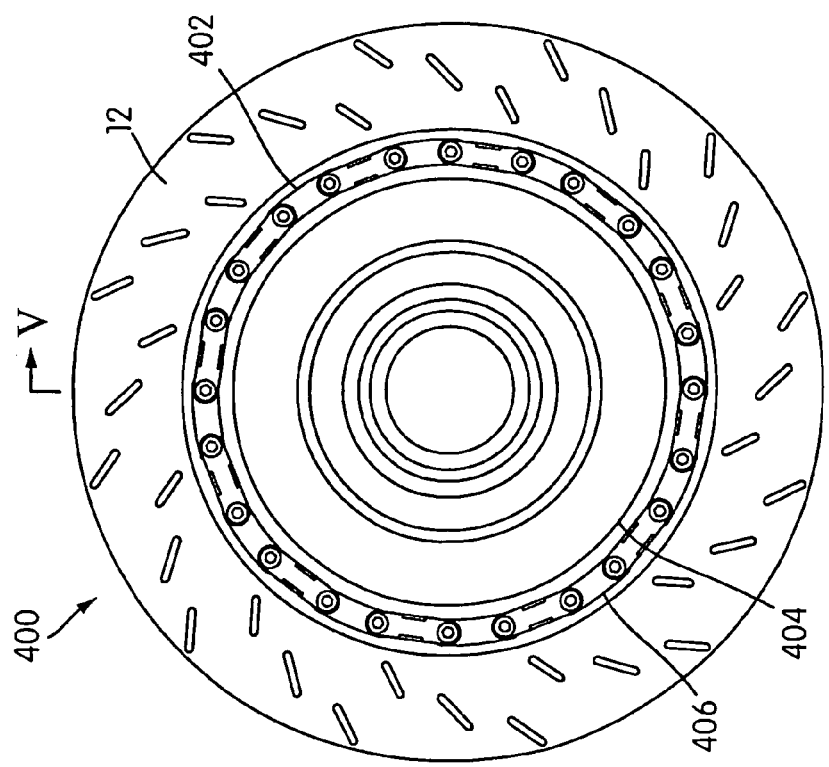
FIG. 3A is a front view of a brake rotor attached to a hub with an integrated hat portion in accordance with another embodiment of the invention.
Figure 3C:
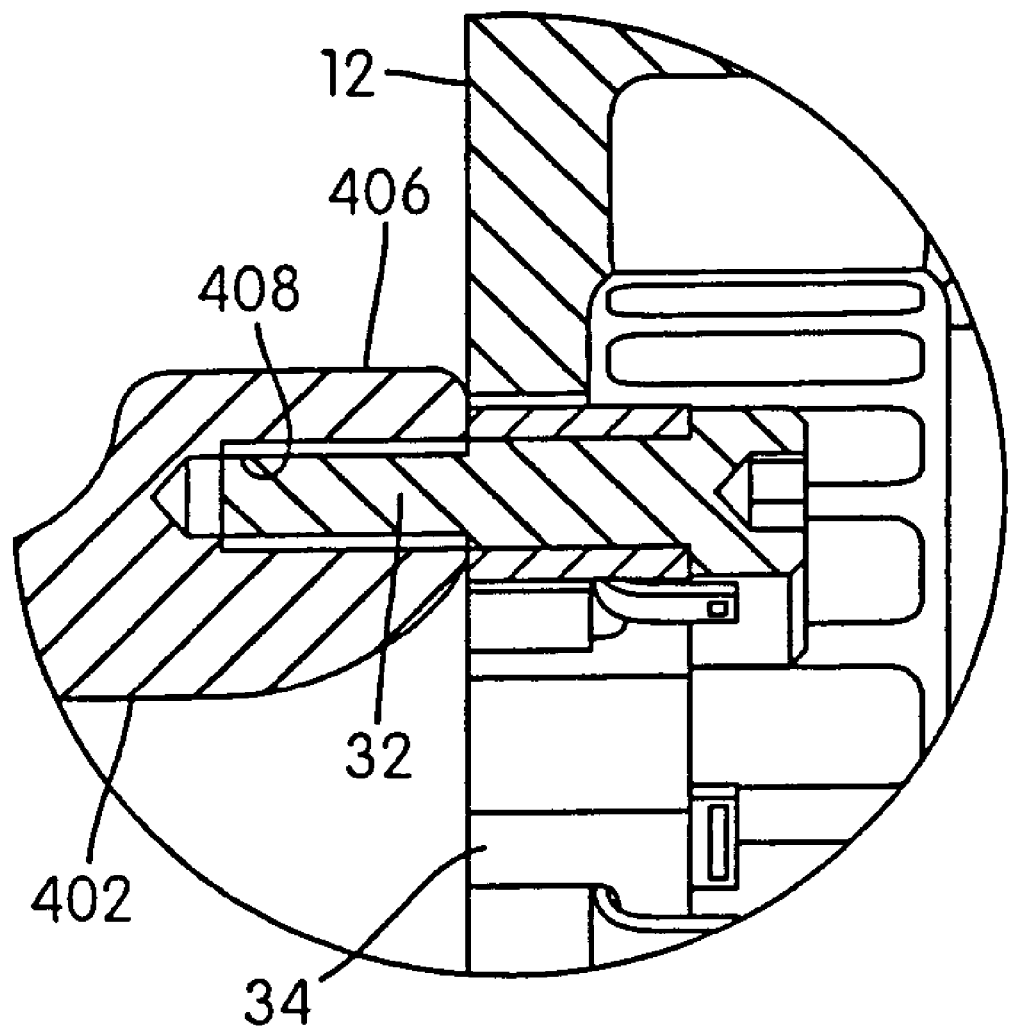
FIG. 3C is an enlarged view of section VI of FIG. 3B.

FIGS. 3A–3C show a rotor assembly 400 including a rotor disc 12 that is secured to a wheel hub 402 having an integral hat portion 404. Hat portion 404 has a cylindrical side wall 406 similar to the hat portion 302 in FIGS. 2A–2C with a plurality of spaced channels 408 sized to receive a fastener to secure the rotor disc 12 to the hub 402. Again the remaining elements of the rotor assembly that are similar to the embodiment shown in FIG. 1A-1C are not described in detail.

Next, the mounting arrangement for securing the rotor disc 12 to any one of the hat portions 22, 302, 404 in accordance with the invention is described in detail.

FIGS. 5A through 5D show details of a fastener assembly in accordance with this invention that connects the rotor 12 to the hat portion 22. For purposes of simplicity, the connection between the rotor 12 and the hat portion 22 will be described, but it should be understood that the connection would be the same for hat portion 302 and hat portion 404. In the latter cases, the fastener extends into channels 310 and 408, respectively, rather than apertures 25.

The fastener assembly includes a bobbin 34 (also called a dog drive lug), an optional spring 36, and fasteners 32, which in this case are bolts. These elements work together to securely clamp the tabs 20 of the attachment flange 16 of the rotor 12 to the shoulder 24 of the hat portion 22 through the aperture 25. As noted above, rotor disc 12 has tabs 20, unlike the prior art perforations. Another difference between this assembly and prior art assemblies is that the hat portion 22 has circular apertures for receiving fasteners rather than straight edged slots. As seen in FIG. 1A, the rotor disc 12 in this case has twelve tabs 20. The hat portion 22 has twenty four apertures 25 designed to receive two fasteners 32 on each side of a tab 20. By this, any twisting experienced by the fastener assembly will occur around the tabs 20. Twisting transferred to the fasteners 32 will significantly reduce the wear on the apertures 25 of the hat portion 22. This allows the hat portion 22 to be made of materials that have a lower hardness, such as aluminum, if desired.

Bobbin 34 is formed as a binocular shape with a pair of columns 38 connected by a bridge 40. Each of the columns 38 has a through passage 42 for receiving a fastener, in this case bolt 32. It is preferred that the passage 42 have a non-circular or elongated hole shape, for reasons discussed below, although a circular aperture can be also be used. The height of the columns 38 is larger than the height of the bridge 40, thus forming a gap 44 between the columns 38 and below the bridge 40.

Preferably, bobbin 34 is formed of a material that has a higher yield strength and higher fatigue strength than cast iron. For example, the bobbin 34 may be made of stainless steel powdered metal, which has a tensile strength of about 70 ksi and a yield strength of about 45 ksi. This is almost double the strength of the material used for the rotor 12. Stainless steel is also more durable with respect to high temperature than cast iron. Yield strength tends to drop as material is heated, but the yield strength of stainless steel drops more slowly with increasing temperature than the yield strength of cast iron, which drops quickly with increasing temperature. Preferably, the bobbin 34 is made of powdered stainless steel, which can be preformed by molding to reduce manufacturing costs. Stainless steel also offers corrosion resistance.

As seen in FIGS. 5A–5D, the spring clip 36 can be preassembled onto the bobbin 34. The spring clip 36 is shown in detail in FIGS. 6A–6D. As seen, spring clip 36 is formed in a generally U-shape including a base 46 and a pair of opposed legs 48. Each leg 48 has an inner surface with a protrusion 50 formed at the top edge. The protrusion 50 is shown as an elongated ridge, but may be formed as a dimple or a series of dimples, for example. The base 46 has a flat central portion 52 and a pair of wings 54 bent downwardly away from the legs 48. The spring clip 36 may be molded or bent from sheet metal or made from any other suitable material, such as stainless steel, which offers corrosion resistance. The wings 54 are formed with a narrow neck 56 to facilitate bending. By this configuration, the wings 54 can be biased toward the base 46 upon an application of force.

Figure 5B:
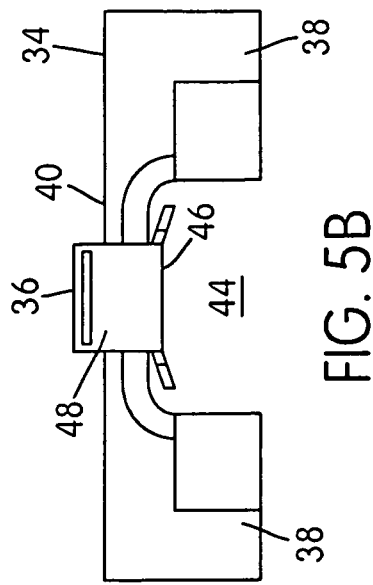
FIG. 5B is a front view of the bobbin and the spring clip of FIG. 5A.
Figure 5D:
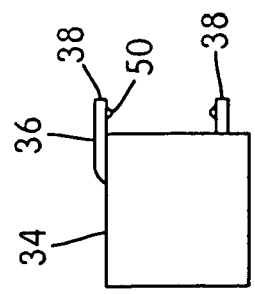
FIG. 5D is a side view of the bobbin and the spring clip of FIG. 5A.
Figure 5A:
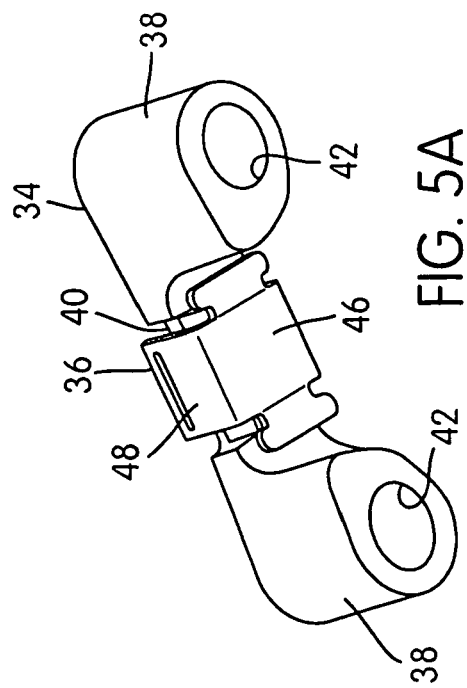
FIG. 5A is an enlarged side perspective view of the bobbin with the spring clip in accordance with an embodiment of the invention.
Figure 5C:
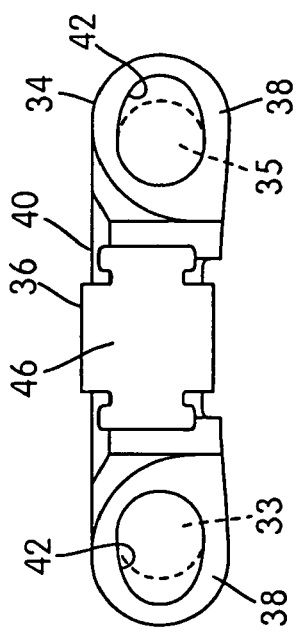
FIG. 5C is a bottom view of the bobbin and the spring clip of FIG. 5A.
Figure 6A:
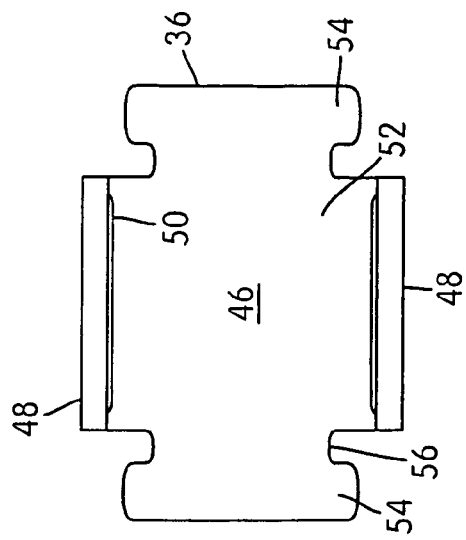
FIG. 6A is an enlarged side perspective view of the spring clip of FIG. 5A.
Figure 6B:
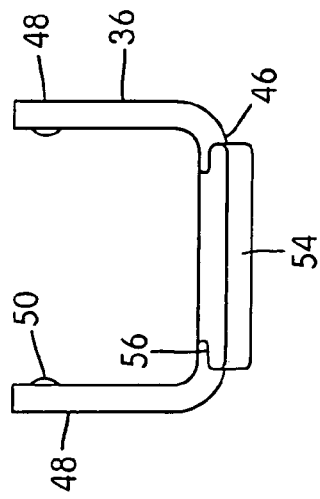
FIG. 6B is a front view of the spring clip of FIG. 6A.
Figure 6C:
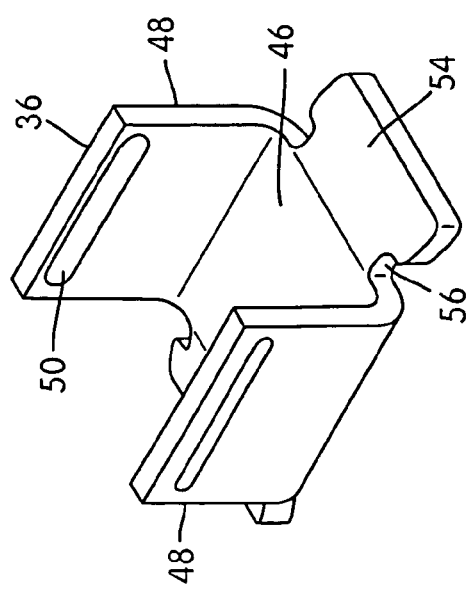
FIG. 6C is a top view of the spring clip of FIG. 6A.
Figure 6D:
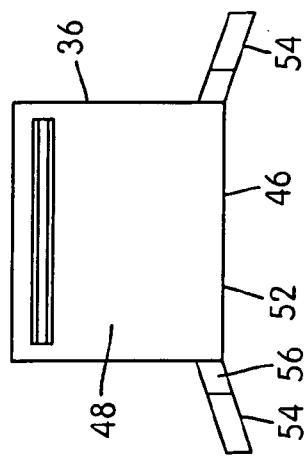
FIG. 6D is a side view of the spring clip of FIG. 6A.

Referring back to FIG. 5B, the spring clip 36 is assembled to the bobbin 34 by placing it on the bridge 40 with the base 46 against the lower portion of the bridge 40 and with the legs 48 straddling each side. The protrusions 50 overlie the upper portion of the bridge 40 to hold the spring clip 36 securely in place, as seen in FIG. 5D. The wings 54 protrude into the gap 44. It can be appreciated that the spring clip 36 may be preassembled to the bobbin 34 before the rotor 12 and hat portion 22 are assembled.

Figure 7:
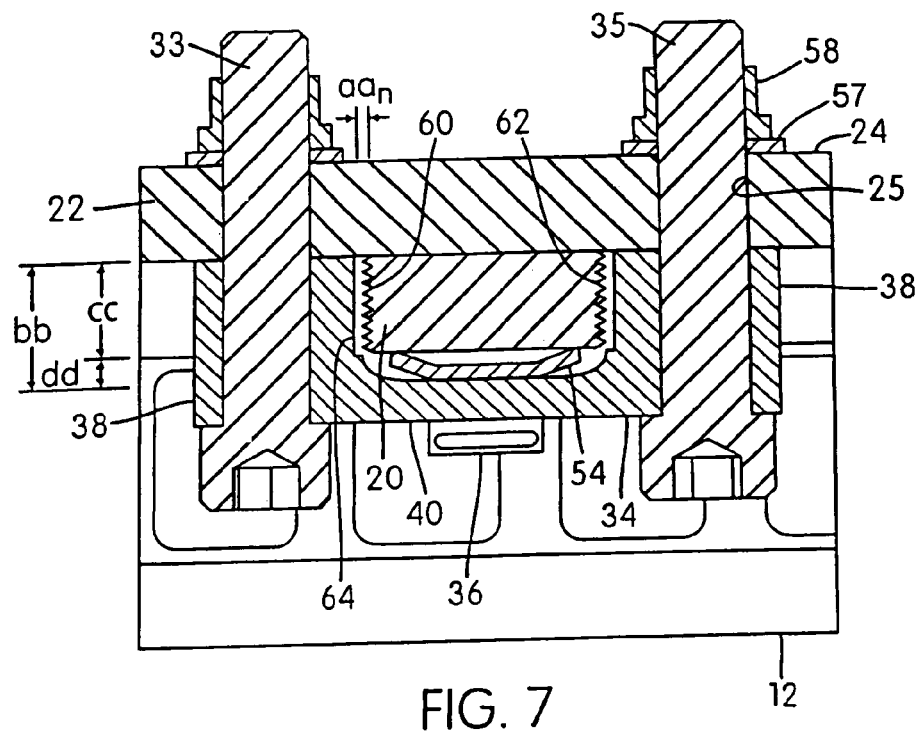
FIG. 7 is an enlarged side view in partial cross section of the fastening assembly similar to that of FIG. 1A.

FIG. 7 shows the rotor 12 assembled to the hat portion 22 in accordance with the invention. Rotor 12 is placed against hat portion 22 so that tabs 20 of the rotor attachment flange 16 are positioned against the shoulder 24 between apertures 25. A bobbin 34 with a spring clip 36 is placed over each tab 20 so that tab 20 sits in gap 44 under the bridge 40 and between the columns 38 of the bobbin 34. Wings 54 of the spring clip 36 are biased against the tab 20 to hold tab 20 securely against the shoulder 24 of the hat portion 22. Then, bolts 32 are placed in passages 42 of the bobbin 34, through apertures 25 of the shoulder 24, and secured with washers 57 and nuts 58. This arrangement is repeated for each tab 20 around attachment flange 16. Of course, for hat portions 302 and 404, no nut or washers are needed as the fasteners 32 are threaded directly into channels 310 and 408, respectively.

This invention offers the advantage of a lower rotor failure rate. As the rotor 12 in accordance with this invention has tabs 20 for attachment, rather than perforations as in conventional rotors, failure of the attachment flange 16 is greatly reduced. In conventional rotors, the attachment flange has a plurality of apertures that receive fasteners. As the rotor is heated due to the braking force, the strength of the flange drops as cast iron has a low fatigue strength. In the perforated flange, which is typically made of cast iron, the connection between the fastener and the perforated flange induces stress concentrations on the edge of the perforations. As a result, the flange tends to fail. In this invention, use of the perforations for making the connection is eliminated. The rotor is driven through the radial side edges of the tabs 20, which are stronger and accordingly resist failure.

This invention also accommodates thermal expansion of the rotor in each direction, while eliminating rattling. As can be appreciated from FIG. 7, the inner width of the gap 44 created between the columns 38 of the bobbin 34 is slightly greater than the outer width of the tab 20 of the attachment flange 16. This creates a clearance aa on each side of the tab 20 from the bobbin 34. Additionally, the height of the gap 44, shown as bb, is greater than the thickness of the tab 20, shown as cc. The degree of compression allowed for the spring clip 36 is defined by the difference between the sum of the distance between the wings 54 and the base 46 of the spring clip 36, shown as dd, and the thickness cc of the tab 20 and the height of the gap bb. This can be expressed by the formula: (cc+dd)−bb=compression of the spring clip 36. Further, the outer edge of each tab 20, which faces radially inwardly, is not constrained by the bobbin 34 or the clip 36. All of these clearances allow thermal expansion of the tab 20 of the rotor 12 in each direction.

Further, since the spring clip 36 is compressed against the tab 20 upon assembly, the tab 20 will not rattle due to the clearances described above. This configuration also has the advantage of only compression loading the spring clip 36. The spring clip 36 is not restrained in the circumferential direction or the radial direction of the rotor and therefore does not experience torsional and bending loading, which could cause a spring to fail.

Another aspect of this invention relates to the interaction between the tabs 20 and the bobbin 34. In operation, the rotor disc 12 rotates with the wheels of the vehicle. Upon application of a braking force by pressing brake pads against the braking surface 14, the friction force times the distance from the center of the piston to the center of the disc creates torque. The torque is transferred from the rotor 12 to the hat portion 22 to the wheel to effect braking. Specifically, torque is transferred through the attachment flange 16 and tabs 20 to the bobbin 34 and the bolts 32. The bolts 32 transfer the torque to the shoulder 24 of the hat portion 22, which then transfers it to the wheels through the mounting surface 26. The interaction between the side edges of the tabs 20 and the bobbin 34 will only allow in-plane torque transfer, which reduces the twisting moment on the rotor flange 16.

A significant advantage that this configuration has over prior art configurations is that the connection of the hat portion 22 to the rotor disc 12 is effected in the same plane as the rotor disc 12. By clamping the tab 20 of the attachment flange 16 of the rotor disc 12 with the fastening assembly, including the fastener 32 and the bobbin 34, the friction force experienced by the braking surface 14 is transferred as torque directly in the same plane to the hat portion 22. As the connection created by the fastener assembly is in axial alignment with the rotor disc 12, no moment arm is created. This transfers the torque without bending, which can create problems with run-out and premature fracture.

It is desirable to move the stresses created in the assembly due to the braking force and torque transfer to the bobbin 34, which is made of a stronger material. In operation, the bobbin 34 transfers torque from the tab 20 to the bolts 32. It is preferred that the bobbin 34 transfers the torque to the leading bolt only. When the trailing bolt receives torque also, the bobbin 34 can be subjected to bending forces that will twist and can ultimately break the bobbin 34 or rotor 12. For this reason, the bolt passage 42 is made non-circular, and preferably an elongated hole in cross section. This is seen clearly in FIGS. 5A and 5C. Assuming the rotor disc 12 seen in FIG. 4A is rotating clockwise, each bolt 32 is positioned at the inner part of the passage 42, shown in dotted lines in FIG. 5C, in an offset configuration. This causes the leading bolt 33, seen on the left, in this case, to receive the torque transferred through the right side of the left hand passage 42. The trailing bolt 35, seen on the right, does not receive torque as it does not touch the right side of the right hand passage 42.

In another feature of this invention, the bobbin 34 and tab 20 self correct misalignments in the assembly. Due to machining variances, which are unavoidable, each tab 20 is not exactly the same size and position as the next tab 20. So, since each tab 20 transfers torque to each bobbin 34, some variances can cause uneven torque transfer. This causes uneven load distribution that creates bending stresses in the attachment flange 16 of the rotor disc 12. Another feature of this invention uses a self correcting mechanism or crush zone to accommodate these variances.

Figure 4B:
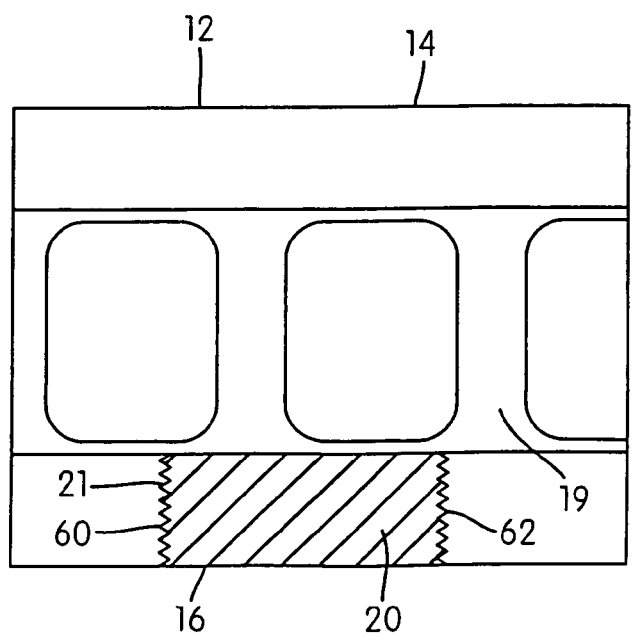
FIG. 4B is an enlarged side view in partial section of the rotor taken along line VII—VII in FIG. 4A.

Referring to FIGS. 4B and 7, in driving operation, the rotor disc 12 will rotate clockwise, for example. Each tab 20 has a leading edge 60 and a trailing edge 62. The leading edge 60, seen on the left side in this case, should contact the inner surface 64 of the bobbin 34 to transfer the torque upon braking. However, if the rotor flange 16 and/or the bobbin 34 is not perfect, the torque transfer will not be uniform. Some leading edges 60 may contact the inner surface 64 of the bobbin 34 and some may not. In accordance with this invention, the tabs 20 are provided with an edge treatment that creates a deformable, yieldable surface or crush zone between the side edges 60, 62 of the tabs 20 and the inner surfaces 64 of the bobbins 34.

In FIGS. 4B and 7, a threaded or serrated surface 21 is formed on each side edge 60 and 62. The surface 21 defines the contact area between the tab 20 and the bobbin 34. As this contact area is not uniform and is softer than the bobbin 34, when it presses against the surface 42 of the bobbin 34, it will yield. This occurs because the threaded surface 21 will create a high localized contact stress that promotes yielding and because the material of the tabs 20, cast iron for example, has a lower yield strength than the material of the bobbin 34, stainless steel for example. Each tab 20 is spaced a slightly different distance $aa_n$ from its associated bobbin due to machining differences. Upon application of a braking force, the tab 20 having the smallest distance $aa_{min}$ between its leading edge and the bobbin 34 will press against the bobbin 34 first. This surface will yield an amount equal to or greater than the difference between $aa_{min}$ and the maximum distance $aa_{max}$ between the leading edge of one of the tabs 20 and its adjacent bobbin 34. The other tabs 20 that have a spacing $aa_n$, between $aa_{min}$ and $aa_{max}$, will yield a corresponding amount. The surface 21 is designed to have a maximum compression that is equal to or preferably slightly exceeds the maximum difference between the leading edge of a tab 20 and its adjacent bobbin 34, or the difference between $aa_{min}$ and $aa_{max}$.

As each tab 20 deforms according to its particular interaction with its associated bobbin 34 and the distance to the bobbin 34, after several applications of braking force, deformation will occur at the tabs 20 that are spaced closer to the bobbin to obtain even spacing between the tabs 20 and the bobbins 34. This arrangement self corrects or self machines each tab 20 to achieve uniform spacing and thus distribute the transfer of torque uniformly and reduce bending stresses in the assembly. Ideally, deformation occurs relatively quickly after initial use, and certainly well before material fatigue can occur.

Figure 8:
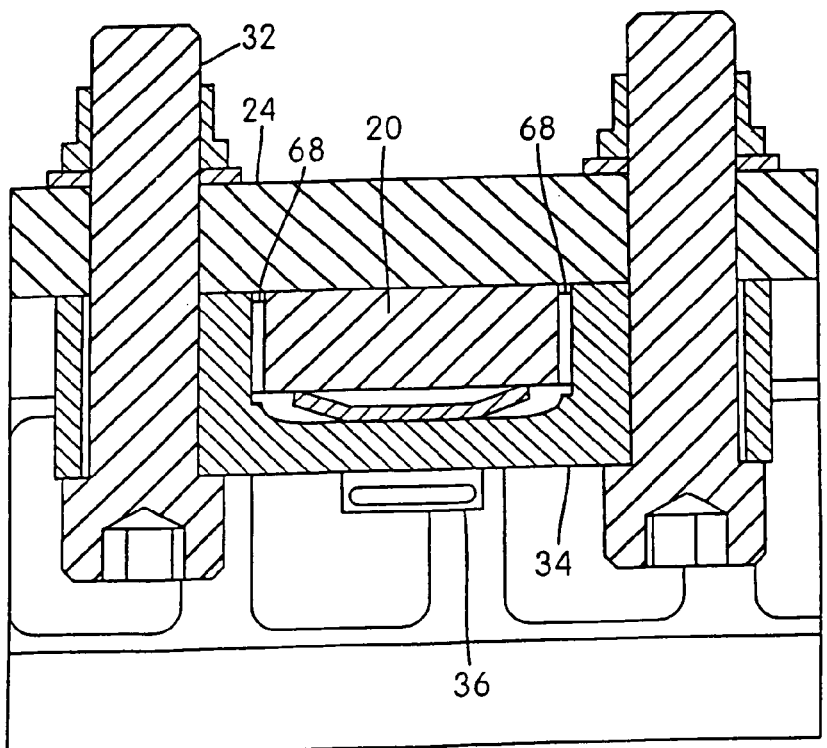
FIG. 8 is an enlarged side view in partial cross section of the fastening assembly similar to that of FIG. 1A in a modified form.

FIG. 8 shows a similar arrangement in which a washer 68 having a low yield strength is used rather than a non-uniform edge. Washers 68 are placed on both sides of the tab 20 so that they may deform upon application of force. An example of a suitable material for washer 68 is copper.

Figure 9A:
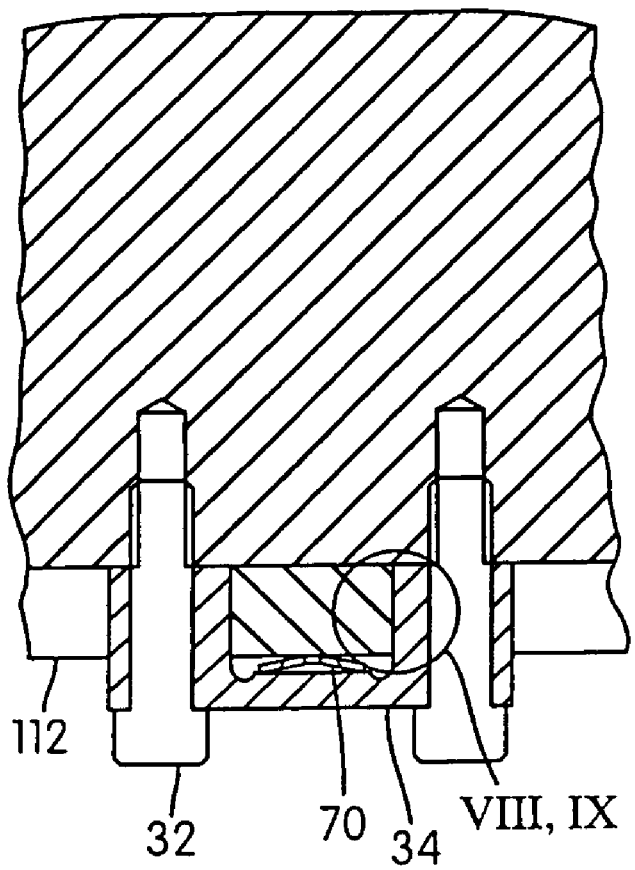
FIG. 9A is an enlarged side view in partial cross section of the fastening assembly similar to that of FIG. 2A with certain modifications.
Figure 9B:
FIG. 9B is an enlarged side view in section of the washer shown in FIG. 9A.
Figure 9C:
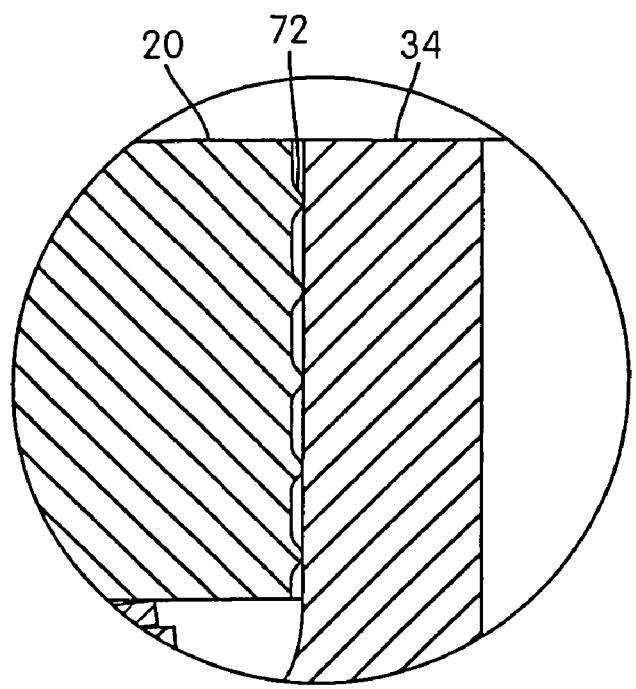
FIG. 9C is an enlarged view of section VIII of FIG. 9A.
Figure 9D:
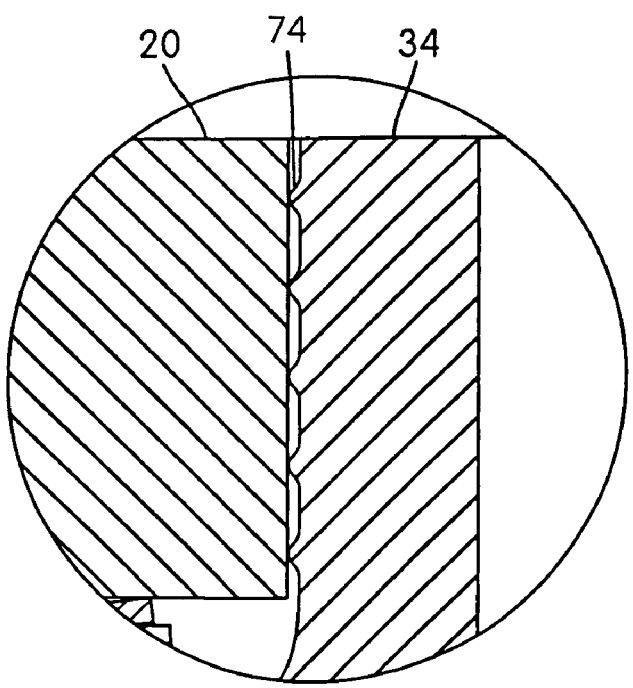
FIG. 9D is an enlarged view of section IX showing a modification of FIG. 9A.

FIGS. 9A, 9C and 9D show a further modification of the self correcting concept. In this case, the tab 20 has a plurality of dimples 72 rather than threads that will form a non-uniform surface and will yield to allow deformation. It is also possible to form the non-uniform surface on the bobbin 34, rather than the tab 20, as seen in FIG. 9D. Dimples 74 are shown on the inner surface 64 of the bobbin 34. It is also possible to use other ways of creating a non-uniform surface in the bobbin 34, including serrations. This may be desirable if other materials are used or if it is easier to machine the bobbin rather than the rotor.

FIG. 9A also illustrates a modification to the fastener. The arrangement seen in FIG. 9A is similar to that in FIG. 7, except that the spring clip 36 is replaced with a simple spring element, such as a Belleville washer 70. A Belleville washer 70 may be used instead of the spring clip 36 in any of the disclosed embodiments. The Belleville washer 70 functions in the same manner as the spring clip 36 in that it allows the tab 20 to expand in the gap 44 while holding the tab 20 firmly against the hat portion 22 to prevent rattling.

FIG. 9A also shows a rotor disc 112, which is a solid or non-vented plate member rather than a ventilated disc, and the shoulder-less hat portion 302, similar to that seen in FIG. 2B. These variations merely illustrate that the various concepts disclosed herein can be used in any number of combinations.

Figure 10:
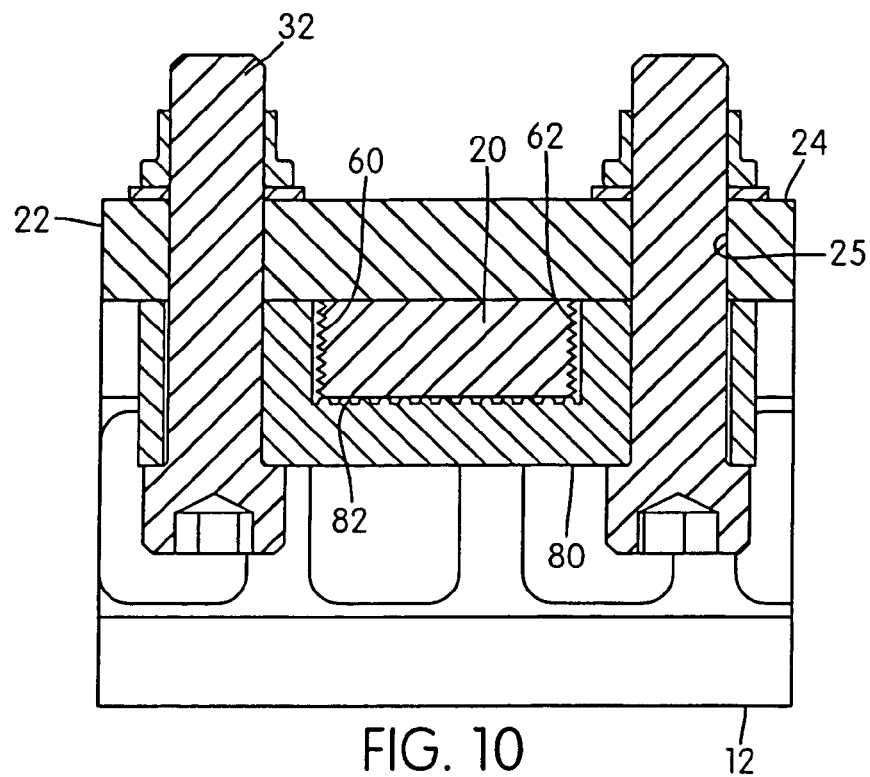
FIG. 10 is an enlarged side view in partial cross section of the fastening assembly similar to that of FIG. 1A in a modified form.

In FIG. 10, the fastening assembly uses a bobbin 80 with crushable dimples 82 instead of a spring 34 or 70. The crushable dimples 82 function in the same manner as the spring 34 or 70 by providing a yieldable surface in the connection between the rotor tab 20 and hat portion 22 to prevent rattling. It would also be possible to form the dimples on the tab 20 with the same effect.

Figure 11:
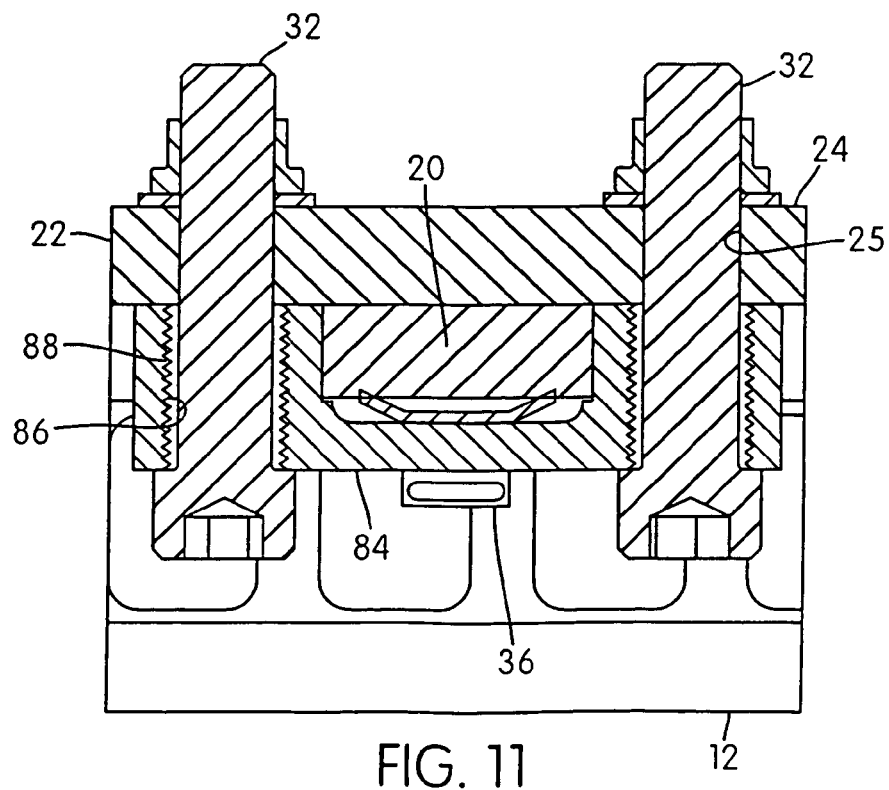
FIG. 11 is an enlarged side view in partial cross section of the fastening assembly similar to that of FIG. 1A in a modified form.

FIG. 11 shows that it is possible to move the crush zone with the same effect. In FIG. 11, the bobbin 84 has an edge treatment within the fastener apertures 86 of the bobbin rather than on the sides of the tabs 20. The edge treatment, in this case, comprises threads 88, which are simple to machine. The threads 88 are crushable when forced against the fasteners 32. Alternatively, the threads could be formed on the fasteners instead of in the fastener apertures in the bobbin. This would reduce manufacturing costs and allow the bobbin to be made of a harder material. It is also possible to use a crushable washer around the fasteners 32 instead of the threads 88 to form a crush zone. In this design, as in the bobbin 34, the yieldable surface, for example threads or a washer, will deform upon an application of torque to an appropriate shape to uniformly transfer torque to each tab 20 and promote torque transfer to the leading bolt.

Figure 12:
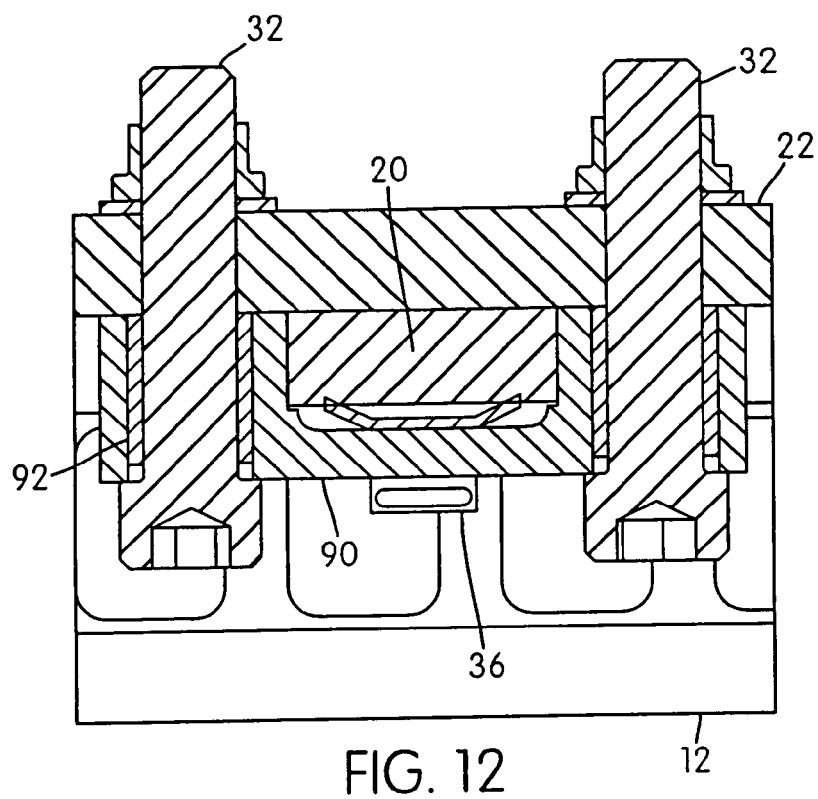
FIG. 12 is an enlarged side view in partial cross section of the fastening assembly similar to that of FIG. 11 in a modified form.

In FIG. 12, the bobbin 90 is similar to bobbin 84 except that rather than having threaded bolt apertures, crushable bushings 92 are located in the bolt holes. By this, when the bobbin 90 is forced against the fasteners 32, the bushings 92 yield and permanently deform to accommodate initial uneven forces and ensure that torque is transferred evenly at each connection. The bushings 92 can be formed of any yieldable material, such as copper. In this case, since the bushings 92 yield rather than the tabs 20 on the rotor mounting flange, the rotor can be made of very stiff, high performance materials rather than cast iron. Suitable materials include those commonly used in racing applications, such as carbon fiber or carbon matrix composites, known as carbon carbon.

Figure 13:
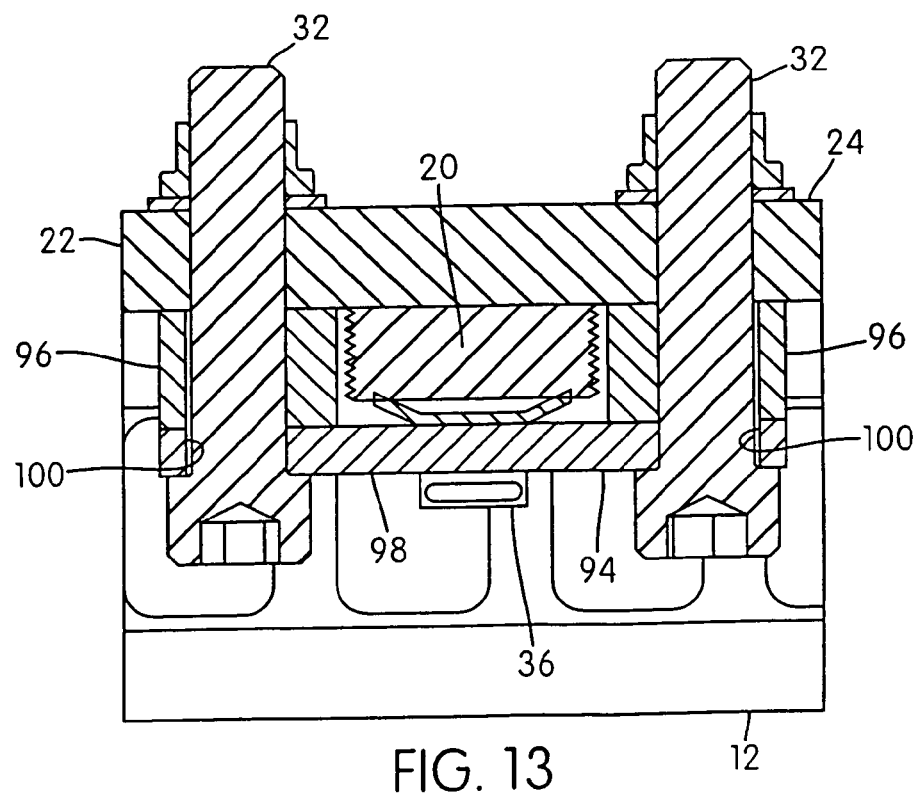
FIG. 13 is an enlarged side view in partial cross section of the fastening assembly similar to that of FIG. 1A in a modified form.

FIG. 13 illustrates a modified bobbin 94 that is formed of separate pieces rather than an integral unit. Bobbin 94 includes a pair of columns, in the form of cylinders 96 and a bridge, in the form of a plate 98 having a pair of apertures 100. To assemble, the plate 98 is mounted over the columns 96 with apertures 100 aligned with the interior bolt channels in the cylinders 96. Fasteners 32 secure the pieces as a unit. It is also possible to fasten the pieces together, by welding for example, prior to assembly if desired, which would reduce the possibility of rattling.

Figure 14:
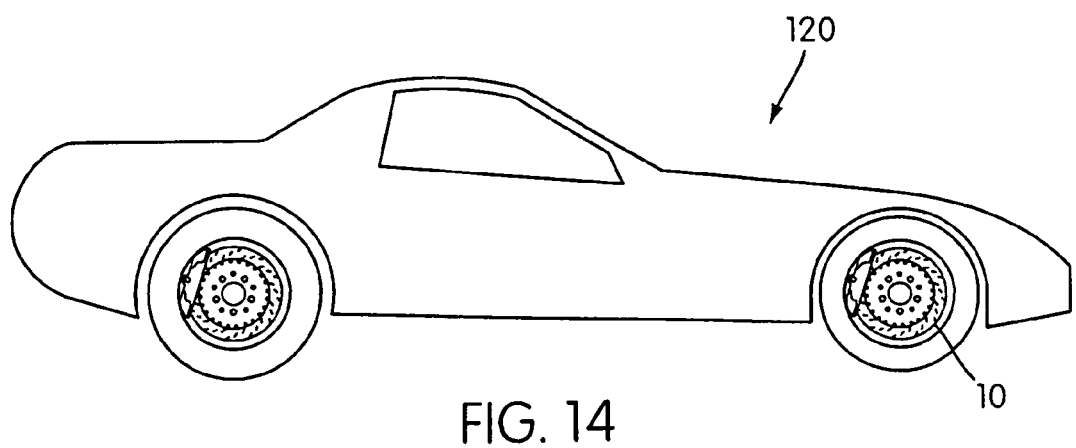
FIG. 14 is a schematic view of the rotor assembly of this invention as applied to a racing car.
Figure 15:
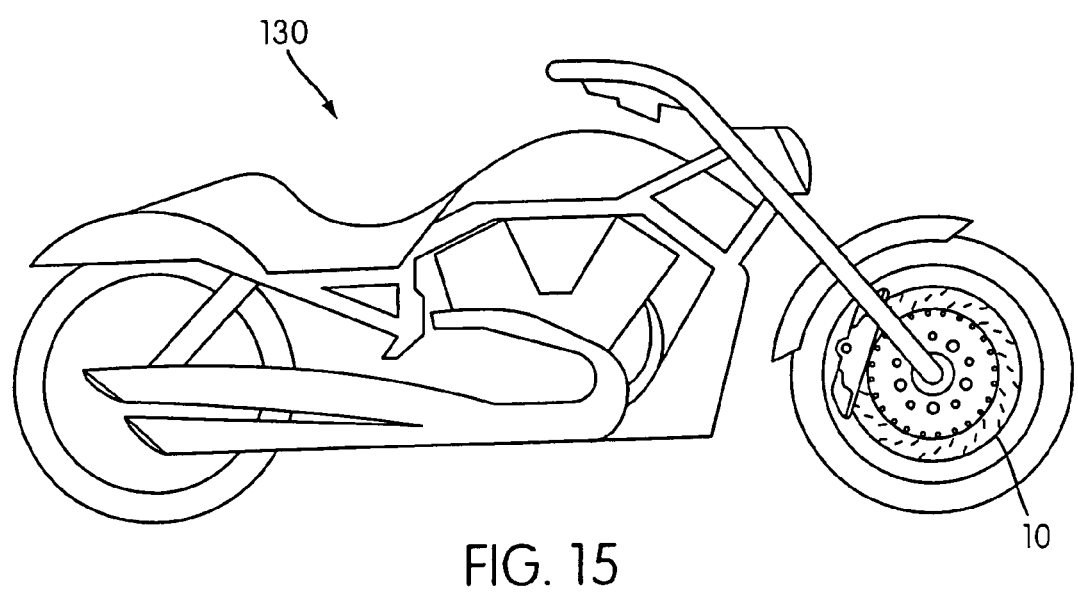
FIG. 15 is a schematic view of the rotor assembly of this invention as applied to a motorcycle.
Figure 16:
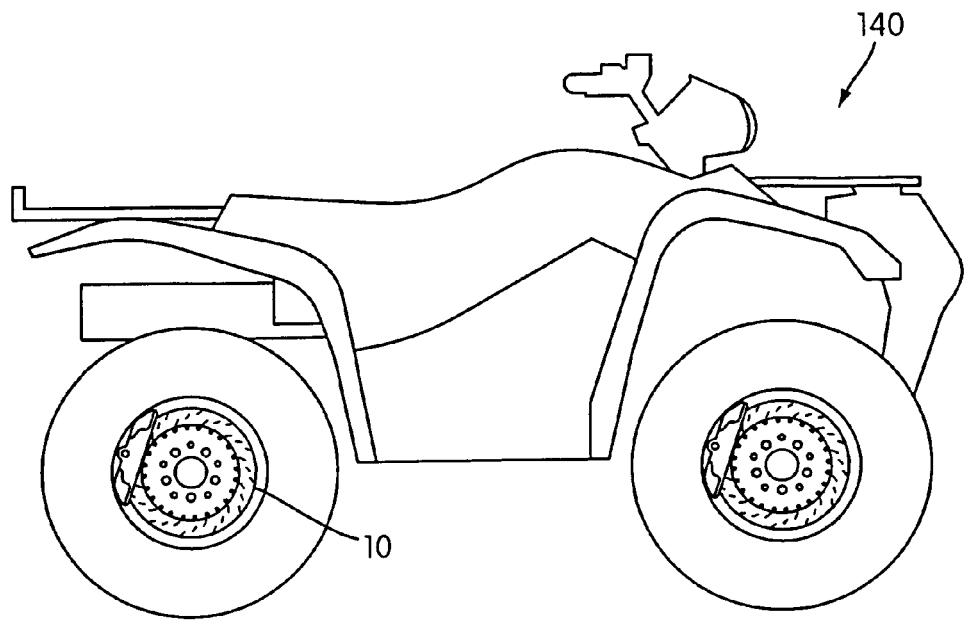
FIG. 16 is a schematic view of the rotor assembly of this invention as applied to an off road vehicle.
Figure 17:
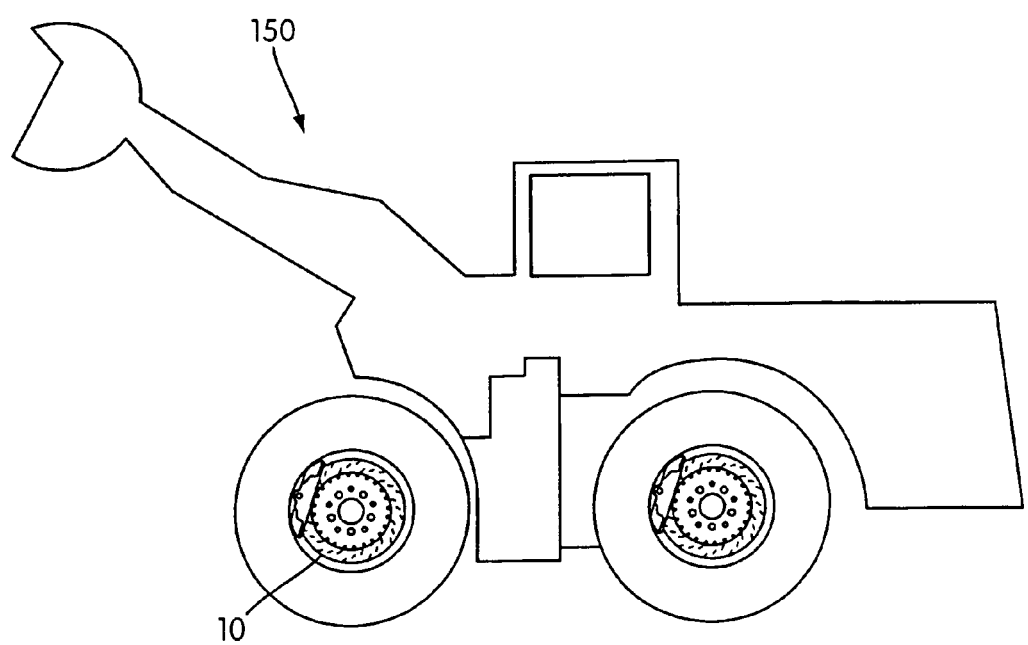
FIG. 17 is a schematic view of the rotor assembly of this invention as applied to an earth moving vehicle.

FIGS. 14–16 show, by way of example only, the various applications suitable for this invention. The rotor assembly can be used on automobiles, both road vehicles and racing cars 120, as seen in FIG. 14. It is also applicable to motorcycles 130, as seen in FIG. 15, and even off road vehicles, such as all terrain vehicles 140 and earth moving equipment 150, as seen in FIGS. 16 and 17, respectively. In short, the invention can be applied to any motorized vehicle. It is further contemplated that this invention can be used in a railway environment on railcars.

The invention is not limited to those embodiments described herein and may encompass various changes and modifications. It will be understood that the various modifications shown herein can be used in any combination, such as multi-piece bobbin 90 with the washer 70 and so on. It is also possible to eliminate various components of the assembly and still have an effective connection. For example, the spring may be omitted. Further, different materials may be used to obtain similar results. For instance, materials for the different components, such as the bobbin, may be varied with respect to relative hardness to modify the location of the crush zones and achieve similar results.

What is claimed is:

1. A brake assembly comprising:
    a rotor having a braking surface and an attachment flange, wherein the attachment flange includes a plurality of spaced tabs with side walls that extend perpendicular to the braking surface;
    a hat portion having a mounting surface for attachment to a vehicle wheel; and
    a fastener assembly that couples the hat portion to the attachment flange, wherein the fastener assembly includes a plurality of bobbins and fasteners, wherein the fasteners connect the hat portion to each bobbin to clamp the attachment flange between the hat portion and the bobbin, such that the bobbin is positioned against the side walls of the tabs of the attachment flange and the attachment flange overlaps part of the hat portion, wherein the fastener assembly further comprises a washer disposed adjacent to the bobbin, wherein the washer has a low yield strength.

2. The brake assembly of claim 1, wherein the washer is disposed between the bobbin and the fastener.

3. The brake assembly of claim 1, wherein the washer is disposed between the bobbin and a side wall of an adjacent tab.

4. A brake assembly comprising:
a rotor having a braking surface and an attachment flange, wherein the attachment flange includes a plurality of spaced tabs with side walls that extend perpendicular to the braking surface;
a hat portion having a mounting surface for attachment to a vehicle wheel; and
a fastener assembly that couples the hat portion to the attachment flange, wherein the fastener assembly includes a plurality of bobbins and fasteners, wherein the fasteners connect the hat portion to each bobbin to clamp the attachment flange between the hat portion and the bobbin, such that the bobbin is positioned against the side walls of the tabs of the attachment flange and the attachment flange overlaps part of the hat portion, wherein the bobbin has inner side walls that abut the side walls of the tabs, wherein the fastener assembly has a crush zone that yields in response to torque transferred from the rotor during braking to accommodate machining tolerances and the crush zone is a surface on the bobbin.

5. The brake assembly of claim 4, wherein the inner side walls of the bobbin are irregular and cause the side walls of the tabs to yield in response to force applied by the bobbin.

6. The brake assembly of claim 4, wherein the crush zone is a surface on the bobbin adjacent the fastener.

7. The brake assembly of claim 4, wherein each bobbin has fastener apertures that receive each fastener and the crush zone on the bobbin is created by threads on the fasteners that abut an inner surface of the fastener apertures.

8. A brake assembly comprising:
a rotor having a braking surface and an attachment flange, wherein the attachment flange includes a plurality of spaced tabs with side walls that extend perpendicular to the braking surface;
a hat portion having a mounting surface for attachment to a vehicle wheel, wherein the hat portion is integral with a wheel hub; and
a fastener assembly that couples the hat portion to the attachment flange, wherein the fastener assembly includes a plurality of bobbins and fasteners, wherein the fasteners connect the hat portion to each bobbin to clamp the attachment flange between the hat portion and the bobbin, such that the bobbin is positioned against the side walls of the tabs of the attachment flange and the attachment flange overlaps part of the hat portion.

9. The brake assembly of claim 8, wherein the hat portion includes an annular shoulder with a plurality of apertures formed therein, wherein the fasteners extend through the apertures.

10. The brake assembly of claim 8, wherein the hat portion includes a peripheral edge with a channel formed therein, wherein the fasteners are threadably received in the channel.

11. A brake assembly comprising:
a rotor having a braking surface and an attachment flange, wherein the attachment flange includes a plurality of spaced tabs having side walls;
a hat portion having a mounting surface for attachment to a vehicle wheel; and
a fastener assembly that couples the hat portion to the attachment flange, wherein the fastener assembly includes a plurality of bobbins and fasteners, wherein the fasteners extend through the hat portion and each bobbin to clamp the attachment flange between the hat portion and the bobbin, wherein each of the tabs has an edge treatment that yields in response to force applied by the bobbin, and the edge treatment includes dimples on the side walls.

12. A brake assembly comprising:
a rotor having a braking surface and an attachment flange, wherein the attachment flange includes a plurality of spaced tabs with side walls that extend perpendicular to the braking surface;
a hat portion having a mounting surface for attachment to a vehicle wheel; and
a fastener assembly that couples the hat portion to the attachment flange, wherein the fastener assembly includes a plurality of bobbins and fasteners, wherein the fasteners extend through the hat portion and each bobbin to clamp the attachment flange between the hat portion and the bobbin, such that the bobbin is positioned against the side walls of the tabs of the attachment flange and the attachment flange overlaps part of the hat portion, further comprising a spring disposed between the attachment flange and the bobbin, wherein the spring is a Belleville washer.

13. A fastener assembly in combination with a brake rotor having attachment tabs, wherein the fastener assembly is designed to connect the brake rotor to a wheel mount, comprising a bobbin having a pair of columns each with a that defines and axis and a bridge connecting the columns, wherein the columns have a first height and the bridge has a second height less than the first height that creates a gap between the pair of columns that is sized to accommodate an one of the attachment tabs of the brake rotor, wherein the columns and the bridge are separate pieces, said first and said second heights are parallel to said axis.

14. The fastener assembly of claim 13, wherein the bobbin has a crush zone.

15. The fastener assembly of claim 14, wherein the crush zone is located in the bolt passage.

16. The fastener assembly of claim 13, further comprising a crushable washer disposed in the bolt passage.

17. A rotor comprising a disc having an annular braking surface and an attachment flange extending radially inwardly from the braking surface, wherein the attachment flange is a series of circumferentially spaced tabs, wherein each tab has a pair of side walls and each side wall has a surface roughness and a predefined additional yieldable textured surface applied thereto to form an edge treatment that yields and deforms in response to an application of torque to create a crush zone that is shaped to uniformly transfer torque from the rotor to a wheel hub.

18. The rotor of claim 17, wherein the irregular surface comprises threads.

19. The rotor of claim 17, wherein the irregular surface comprises dimples.

20. A fastener assembly in combination with a brake rotor having attachment tabs for connecting the brake rotor to a wheel mount, comprising a bobbin having a pair of columns each with a bolt passage that defines and axis a bridge connecting the columns, wherein the columns have a first height and the bridge has a second height less than the first height that creates a gap between the pair of columns that is sized to accommodate one of the attachment tabs of the brake rotor, said first and said second heights are parallel to said axis.

21. The fastener assembly of claim 20, wherein the bolt passages are elongated and non-circular in cross section.

22. The fastener assembly of claim 21, further comprising a pair of bolts received in the bolt passages, wherein each bolt is positioned closer to the bridge in the elongated bolt passage.

23. The fastener assembly of claim 20, wherein the columns and the bridge are integrally formed.

24. A fastener assembly in combination with a brake rotor for connecting the brake rotor to a wheel mount, comprising a bobbin having a pair of columns each with a bolt passage that defines an axis and a bridge connecting the columns, wherein the columns have a first height and the bridge has a second height less than the first height that creates a gap between the pair of columns, further comprising a spring disposed against the bridge of the bobbin, said first and said second heights are parallel to said axis.

25. The fastener assembly of claim 24, wherein the spring is U-shaped with a base and a pair of opposed legs and each leg has an inner protrusion, wherein the spring clamps onto the bridge of the bobbin with the protrusions holding the spring onto the bobbin as a subassembled unit.

* * * * *